Patented Oct. 17, 1922.

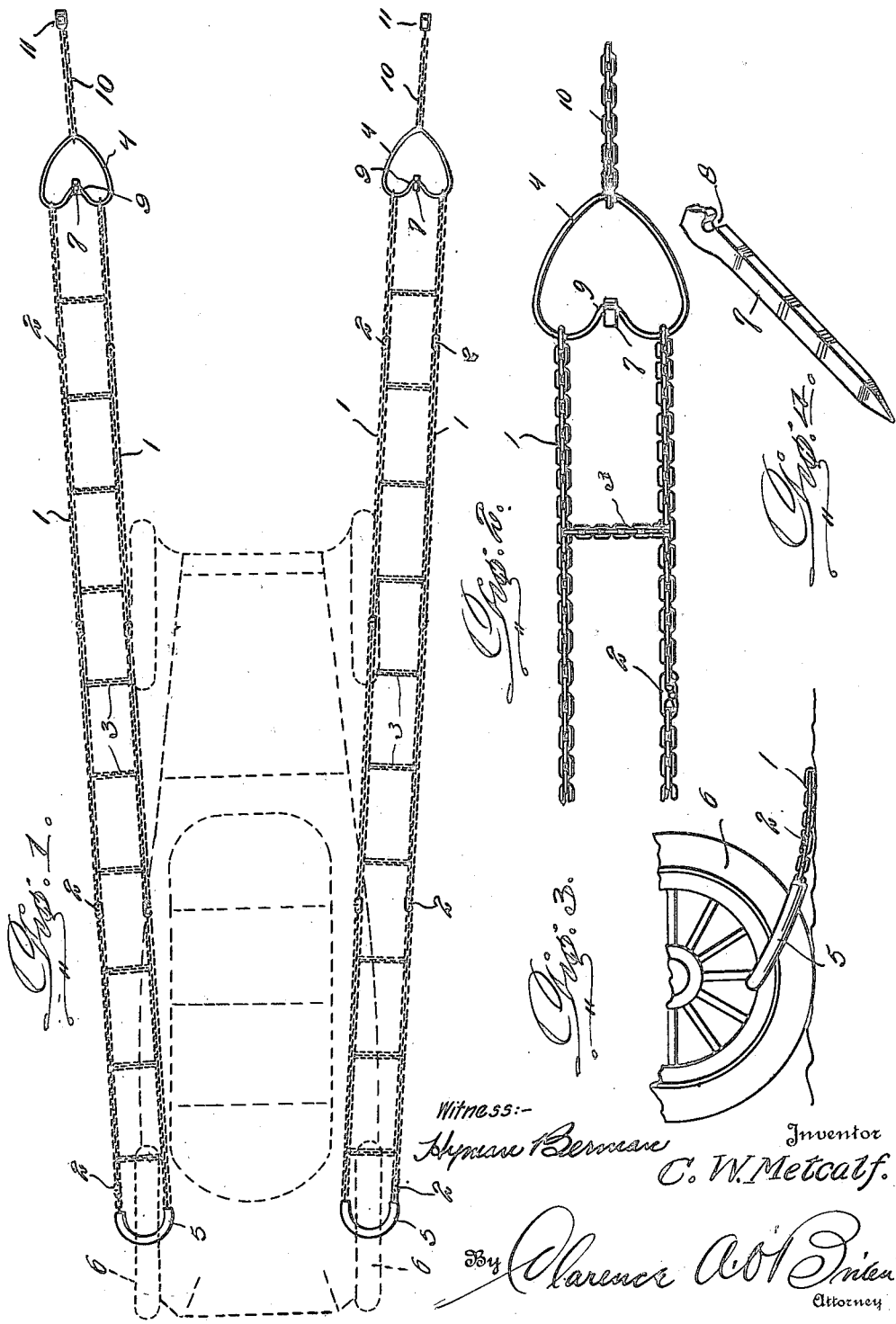

1,432,077

UNITED STATES PATENT OFFICE.

CYRUS W. METCALF, OF GREENRIVER, UTAH.

AUTOMOBILE EXTRICATOR.

Application filed November 1, 1921. Serial No. 512,114.

*To all whom it may concern:*

Be it known that I, CYRUS W. METCALF, a citizen of the United States, residing at Greenriver, in the county of Emery and State of Utah, have invented new and useful Improvements in Automobile Extricators, of which the following is a specification.

My present invention relates to the type of extricating chains that are adapted to be connected at one end to the rear wheels of an automobile and to be anchored at their opposite ends to the ground at a point in front of the automobile so that when power is applied to the rear wheels of the automobile and said wheels travel on the chains, the chains will be wound about the wheels and in that way the extricator will be enabled to pull itself out of quagmires and other bad places in a road.

The object of my invention is to provide simple, easily applied and easily anchored chains of the type defined.

To the attainment of the foregoing, the invention consists in the improvement as hereinafter described and definitely claimed.

In the accompanying drawings, forming part of this specification:—

Figure 1 is a view showing two of my novel chains as properly arranged relatively to an automobile, the automobile being shown by dotted lines.

Figure 2 is a fragmentary plan of the forward portion of one of the chains.

Figure 3 is a detail side elevation showing the manner of connecting one of the chains to an automobile drive wheel.

Figure 4 is a detail perspective showing one of the stakes employed in the anchoring of the chains.

Similar numerals of reference designate corresponding parts in all of the views of the drawings.

The novel chains illustrated are identical in construction and therefore a detailed description of the lower chain shown in Figure 1 and the chain shown in Figure 2 will suffice to impart a definite understanding of both. The chain referred to comprises parallel longitudinal stretches 1 which include sections and having the sections detachably connected together through the medium of double snap hooks 2 or other appropriate devices. At intervals in their length, the stretches 1 are connected together by transverse chain sections 3. At their forward ends the stretches 1 are connected to a heart-shaped open frame 4 that is adapted to lie flat on the ground. The rear ends of the stretches 1 are joined through the medium of a bight on which is a section 5 of rubber tubing or the like, designed and adapted to prevent marring of the wheels 6 when the chain is applied to the wheel as best shown in Figure 3; it being understood in this connection that the chain is applied by opening the rear snap hook 2, and passing one end of the chain stretch between the spokes of the wheel, and then fastening the chain through the medium of the said snap hook 2. Manifestly the detachable connection of the stretches 1 through the medium of the snap hooks 2 will render it feasible to compactly store the chain in a tool box or the like. The heart-shaped frame 4 is designed to be used in conjunction with a stake 7 which is notched at 8 to engage the bight 9 in the base of the frame 4. It will also be understood that a chain section 10 is connected to the forward end of the frame 4 and is designed to be connected to and secured by a stake 11, similar to the said stake 7.

It will be apparent that through the medium of the stakes 11 and 7 and the chain sections 10, the frames 4 can be securely fastened in flatwise position on the ground, after the rear portions of the chains are connected to the rear wheels of the automobile in the manner before described. Then when the automobile is driven forward it will be manifest that the chains will enable the automobile to extricate or pull itself out of a bad place, the chains being wound on the wheels 6 by the rotation of the said wheels on the chains. After an automobile is extricated in the manner indicated, the improved chains may be expeditiously and easily detached from the wheels 6 and stored together with the frames 4, the chain lengths 10 and the stakes 7 and 11 in a tool box or the like.

In the use of the novel chains it will be noted that the frames 4 will operate efficiently in maintaining the stretches 1 of the chains in spaced and parallel relation, and this constitutes an important feature of my invention inasmuch as it is essential to strongly fasten the forward ends of the stretches 1 and at the same time maintain the said stretches in spaced relation so that the wheels 6 can take hold of the transverse chain sections 3.

I have entered into a detailed description of the construction and relative arrangement of the parts embraced in the present and preferred embodiment of my invention in order to impart a full, clear and exact understanding of the said embodiment. I do not desire, however, to be understood as confining myself to the said specific construction and relative arrangement of parts inasmuch as in the future practice of the invention various changes and modifications may be made such as fall within the scope of my invention as defined in my appended claim.

Having described my invention, what I claim and desire to secure by Letters Patent, is:—

An automobile extricator comprising parallel stretches of chain each including sections and detachable connections between the sections, and the rear ends of the stretches being detachably connected together for the ready connection thereof to an automobile drive wheel, interposed sections of chain between the said stretches at intervals in the length thereof, a heart-shaped, open frame with its side rear loops connected to the forward ends of the said stretches, a stake having a notched upper portion to engage the intermediate rear portion of the open frame and hold the same to the ground, a section of chain connected to and extending forwardly from the forward central portion of said frame, and a stake to fasten the forward end of said section of chain to the ground.

In testimony whereof, I affix my signature.

CYRUS W. METCALF.